US008280364B1

(12) United States Patent
Sennett et al.

(10) Patent No.: US 8,280,364 B1
(45) Date of Patent: Oct. 2, 2012

(54) INTEROPERABILITY OF FIRST RESPONDER DEVICES

(75) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1499 days.

(21) Appl. No.: 11/469,448

(22) Filed: Aug. 31, 2006

(51) Int. Cl.
*H04M 3/00* (2006.01)

(52) U.S. Cl. ......................................... 455/419; 370/344

(58) Field of Classification Search ............... 455/414.1, 455/419; 370/344
See application file for complete search history.

(56) References Cited

U.S. PATENT DOCUMENTS

| | | | | |
|---|---|---|---|---|
| 2005/0006109 A1* | 1/2005 | McSheffrey et al. | ............ | 169/75 |
| 2005/0170808 A1* | 8/2005 | Hamilton | .................... | 455/404.1 |
| 2006/0252442 A1* | 11/2006 | Nurmi | ........................... | 455/518 |
| 2008/0037461 A1* | 2/2008 | Biltz et al. | ..................... | 370/328 |
| 2009/0174547 A1* | 7/2009 | Greene et al. | ............ | 340/539.13 |

* cited by examiner

*Primary Examiner* — Marcos Batista
(74) *Attorney, Agent, or Firm* — Turocy & Watson, LLP

(57) ABSTRACT

A system that facilitates inter-operable communications between first responder (FR) wireless communications devices at an emergency location. The system includes an on-site tactical communications plan that is configured into a communications control device. The communications control device is part of an emergency command vehicle. First responders utilize their associated FR devices to establish a wireless IP data session with the communications control device via a macro wireless network. Once the IP data session is established, the FR device is authenticated by the communications control device. The tactical plan is then transmitted to the FR device via the established wireless IP data sessions. Once the tactical plan is transmitted to the FR devices, each of the FR devices comprises identical radio configurations and channel assignments.

26 Claims, 12 Drawing Sheets

INTEROPERABILITY OF FIRST RESPONDER DEVICES

BACKGROUND

First responders are organizations and personnel that provide law enforcement, safety and protection services to the public. The first responders include law enforcement officers such as police, sheriff, highway patrol, detectives, special law enforcement, federal bureau of investigation (FBI), drug enforcement administration (DEA), military personnel, border patrol, and others. First responders also include fire and safety personnel, for example, firefighters, emergency medical services personnel, Red Cross personnel, and other emergency workers.

When multiple agencies arrive on the scene of an incident, there is virtually no ability to locally communicate between the various agencies due to the lack of interoperability between the communication units used by the various agencies. While first responders may have devices which have dual mode of operations (e.g., walkie talkie and cellular), there are no mechanisms to manage and control these devices to achieve interoperability of the communications devices at the scene of the incident.

When groups of first responders need to communicate with each other at an incident site, manual procedures such as "runners" are used to relay information. In some cases, inter-agency communications may occur by relaying information through the respective dispatch centers. However, this is a very slow and inefficient way of communicating when multiple agencies from multiple jurisdictions are involved. Thus, some groups of first responders may elect to just perform their respective tasks and operate without any type of unified communication or operation.

However, the lack of inter-operable communications between on-scene agencies can result in ineffective coordination, often with tragic results. Further, the lack of communications capability may cause inadequate situational awareness among the first responder personnel and among various first responder teams because there is no way to know the location of the various first responders at the incident scene without constant monitoring of voice communications. Integral to the lack of situational awareness at an incident site is the lack of an accurate system for maintaining accountability of the first responders at an incident site.

The typical methods used to maintain accountability of first response personnel are manual methods, wherein some physical means is used for identifying whether a responder is present at the incident scene, and in some cases to identify where the responder is assigned during the emergency. Because these methods are manual, they do not provide a way to accurately account for all first responder personnel at an incident site, nor do they provide ways to track the actual location or movement of first responder personnel around the incident site as the emergency unfolds. Consequently, the incident command personnel do not have detailed information on the location of the first responders and can lose accountability of first responders.

The lack of adequate means for inter-operable communications between on-scene agencies at incident sites results in incident commanders and first responder personnel that lack the detailed information and situational awareness of the incident scene to effectively respond to an emergency. The cascading effect typically results in slower response times to emergencies and a much higher level of risk for the first responders and incident victims.

SUMMARY

The following presents a simplified summary in order to provide a basic understanding of some aspects of the claimed subject matter. This summary is not an extensive overview, and it is not intended to identify key/critical elements of the claimed subject matter or to delineate the scope thereof. Its sole purpose is to present some concepts in a simplified form as a prelude to the more detailed description that is presented later.

Disclosed herein are systems, methods, apparatuses, and articles of manufacture that facilitate interoperability of first responder (FR) wireless communications devices at an emergency location. In more detail, it may be desirable to provide the control and management of inter-operable communications between FR devices of the first responders at the scene of an incident. Conventionally, this issue has been addressed by manual procedures, however the manual procedures are not completely effective and first responder communication interoperability is still a major problem.

In accordance with one aspect described herein, an on-site tactical communications plan is configured into a communications control device. The communications control device is part of an emergency command vehicle. First responders utilize their associated FR devices to establish a wireless internet protocol (IP) data session with the communications control device via a macro wireless network. Each of the FR devices contains a pre-programmed address of the communications control device to facilitate communications. Once the IP data session is established, the FR device is authenticated by the communications control device. The tactical plan is then transmitted to the FR device via the established wireless IP data sessions. The tactical plan can then be displayed on the screen of the FR device with associated soft keys assigned. Once the tactical plan is transmitted to the FR devices, each of the FR devices comprises identical radio configurations, channel assignments and identification of other supporting information.

In another example, additional FR devices enter the incident site after the first FR devices and corresponding responders have been dispatched. The additional FR devices establish a wireless IP data session with the communications control device via the macro wireless network. The communications control device authenticates the additional FR devices and adds the FR devices to a list of associated FR devices currently in use at the site of the incident. Once the wireless IP data session has been established, the communications control device transmits an updated tactical communications plan to each additional FR device. The updated tactical communications plan is also available to the first FR devices currently in use at the site. The updated tactical communications plan can then be displayed on the screens of the FR devices with associated soft keys assigned. Once the updated tactical plan is transmitted to the FR devices, each of the FR devices comprises identical radio configurations, channel assignments and identification of other supporting information.

In another aspect described in greater detail herein, additional multimedia information can be disseminated to the FR devices via the communications control device. The additional multimedia information is configured into the communications control device and transmitted to the intended FR devices via a wireless IP data session using the macro wireless network. Each recipient FR device authenticates, receives and stores the additional multimedia information. Once the information is received, the FR device sends back an acknowledgement to the communications control device via the wireless IP data session. The communications control device receives the acknowledgement responses and maintains a status display listing which FR device received and/or responded to the additional information broadcast. The additional multimedia information can then be displayed on the screens of the recipient FR devices with associated soft keys assigned.

In another aspect described in greater detail herein, the incident commander or assigned communication officer needs to contact all on-site first responders at the same time. The communication officer enters instructions to the communications control device that all FR devices should be tuned to an indicated channel. Using the established wireless IP data sessions of the macro wireless network, the communications control device instructs each FR device to tune to the indicated channel. Each of the FR devices tunes to the indicated channel and responds to the communications control device. The communications control device receives the responses and provides a status display indicating the FR device(s) that have received and/or responded to the instructions. When all FR devices have responded, the incident commander then issues the designated message. Once the message is received, the FR devices send an acknowledgement to the communications control device which receives the acknowledgement and updates the status display. If the first responder is incapacitated or otherwise unable to operate the FR device, the communications control device can remotely switch the designated FR device(s) to the specified channel.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
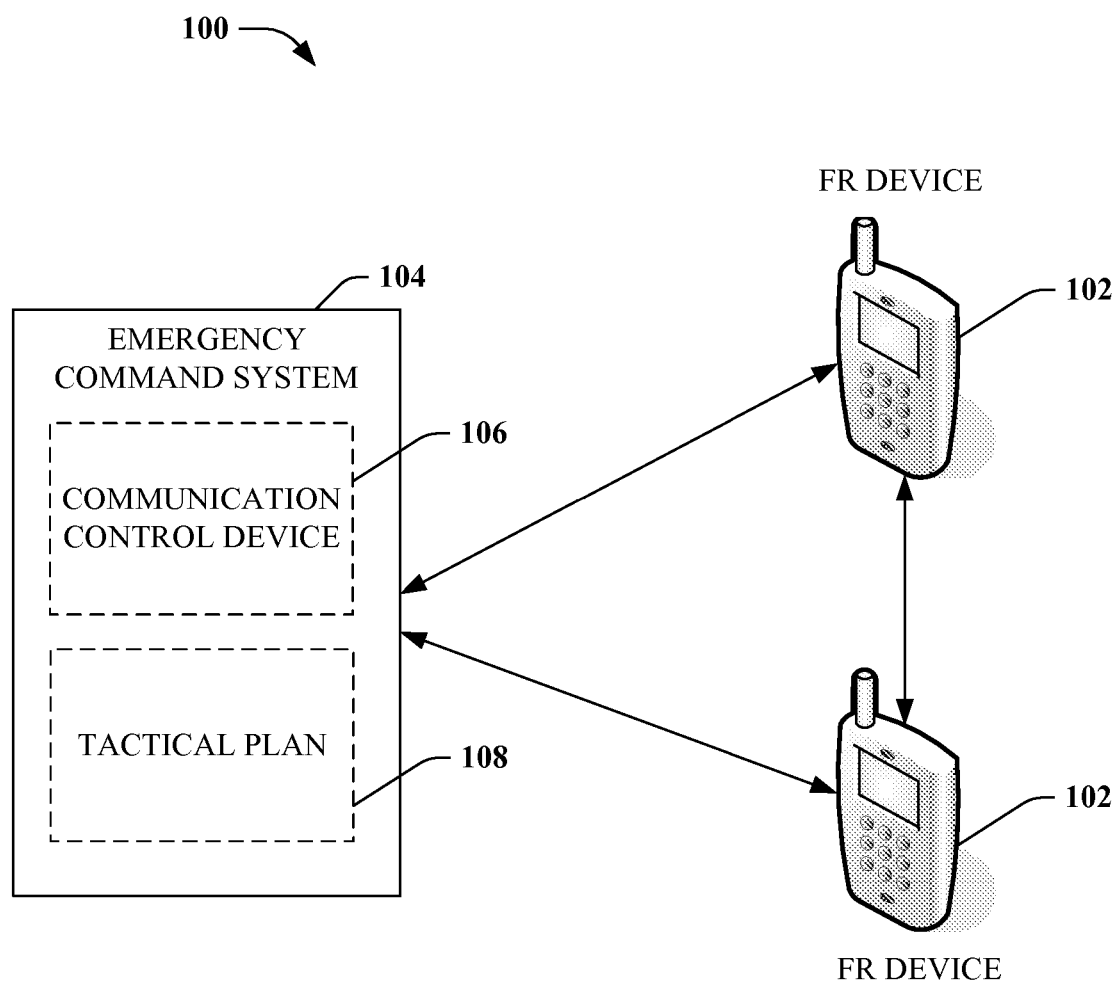
FIG. 1 illustrates a system that facilitates interoperability of first responder (FR) wireless communications devices at an emergency location.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computing device, such as a mobile handset, to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The communications system provides for the control and management of the interoperability of the wireless communications devices of the first responders (FR) at the scene of an incident. Generally, first responders at the scene of an incident are arriving from multiple jurisdictions and various communities, thus making interoperability of the various communications devices difficult. A communication control device of an emergency command system maintains a tactical communications plan and transmits the plan to the various FR devices at the scene of the incident. The tactical communications plan allows the FR devices to maintain the same radio configuration, channel assignments and identification of supporting information. Once the tactical communications plan is transmitted, interoperability of the FR devices can be managed and controlled by the communications control device.

Turning now to the drawings, FIG. 1 illustrates a system 100 that facilitates interoperability of first responder (FR) wireless communications devices 102 at an emergency location, incident site, or similar location. The FR devices 102 are typically dual mode wireless devices that are capable of communicating directly with other FR devices in push-to-talk or walkie talkie mode (e.g., ultra high frequency (UHF), very high frequency (VHF), association of public safety communications officials international—Project 25 (APCO P25), Motorola® trunking) and are capable of voice and data communications with the macro wireless network using technologies such as global system for mobile communications (GSM), universal mobile telecommunications systems (UMTS), general packet radio service (GPRS), enhance data rates for GSM evolution (EDGE), high-speed downlink packet access (HSDPA), code division multiple access 2000 (CDMA2000), and integrated digital enhanced network (iDEN). The FR devices can also provide at least one of voice services (e.g., voice-over-IP (VoIP)), streaming video services, file transfers or other types of data services (e.g., pictures, text, telemedicine, sensory data). It is thus to be understood that any suitable voice services, video services and/or data transfer services for wireless communications devices are contemplated and intended to fall under the scope of the hereto-appended claims.

The FR devices 102 of system 100 communicate directly with other FR devices 102 at the emergency location and communicate with an emergency command system 104. The emergency command system 104 is typically a mobile or stationary structure proximate to the incident site. The emergency command system can be a structure that was in existence before the incident occurred or it can be part of a temporary structure which was constructed after the incident occurred. For example, the emergency command system can be part of an Emergency Command Center (ECC), Mobile Command Post (MCP), an emergency command vehicle, a hospital or any other suitable structure.

The emergency command system comprises a communication control device 106 utilized by an incident commander or assigned communications officer in the emergency command system 104 to communicate with the FR devices 102. The communications control device 106 comprises at least one of a personal computer (PC), personal digital assistant (PDA) and similar device with macro wireless network capabilities. The incident commander or assigned communications officer configures an on-site tactical communications plan 108 into the communications control device 106. The tactical communications plan 108 includes at least one of allocation of the push-to-talk or walkie talkie channels, trunk groups, wireless macro network configuration information, telephone lists, and web sites for additional supporting information (e.g., material safety data sheets (MSDS)).

For example, the primary communications between first responders is using the walkie talkie mode of the associated FR devices. In walkie talkie mode of operation, the FR devices have several available communication channels. The incident commander or communications officer would set up the tactical communications plan to assign use of each of the available channels. For example, Tac 1—All responders, Tac 2—Command, Tac 3—In building responders, Tac 4—Air support, Tac 5—Medical support and Tac 6—Logistics support. It is thus to be understood that any suitable information or services to be included in the tactical communications plan is contemplated and intended to fall under the scope of the hereto-appended claims.

The first responders that arrive at the incident site will power on the associated FR devices to communicate with the emergency command system 104 via the communications control device 106. Each of the FR devices 102 will have a pre-programmed address of the communications control device 106 of the emergency command system 104 that allows for direct communications. Communications between the FR devices 102 and the communications control device 106 are established via the pre-programmed address. The tactical communications plan 108 is then transmitted to each of the FR devices 102. Once the tactical communications plan 108 is received, each of the FR devices 102 comprises the same radio configuration, channel assignments and identification of other supporting information, facilitating interoperability between devices at the incident site. Furthermore, the tactical communications plan can be displayed on the screens of the FR devices 102 with associated soft keys assigned so that the first responders could quickly and easily transfer between the various assigned tactical channels.

Figure 2:
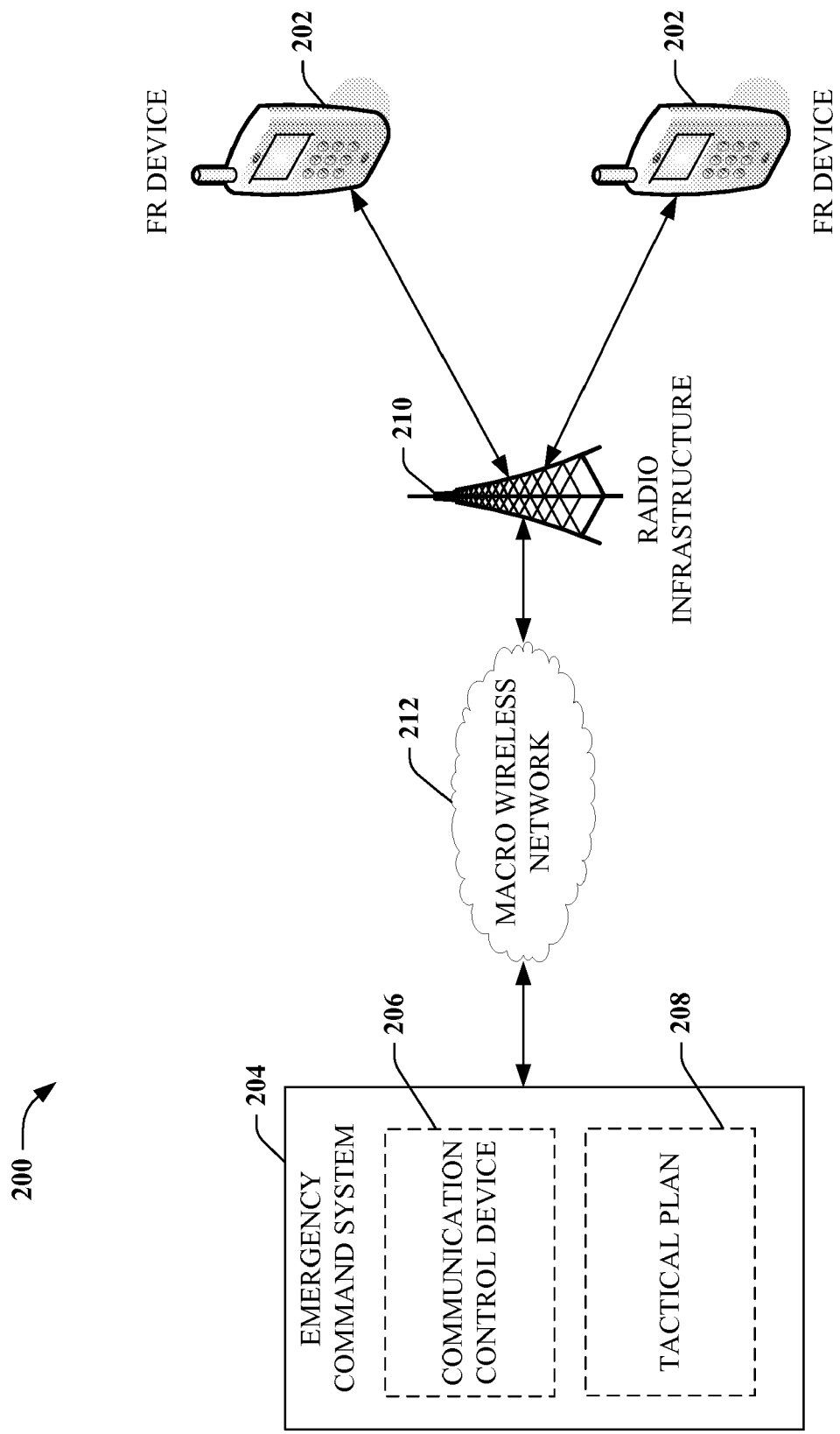
FIG. 2 illustrates the communications system, wherein a wireless IP data session is established between the FR devices and the communications control device via a macro wireless network.

To better illustrate operability of the system 100, a detailed example 200 of one particular utilization of such system 100 is provided herein. This example 200, however, is intended to aid in understanding of the system 100 and is not intended to limit use or operability of such system 100. Specifically, FIG. 2 illustrates the system 200 wherein FR devices 202 establish a wireless IP data session with the communications control device 206 via a macro wireless network 212. Specifically, a wireless macro network 212 utilizes technologies such as GSM, UMTS, GPRS, EDGE, HSDPA, CDMA2000, and iDEN. A radio infrastructure 210 is used to enable the FR devices 202 to connect to the macro wireless network. The FR devices 202 initiate connection with the radio infrastructure 210, which in turn connects to the macro wireless network 212. As stated supra, each of the FR devices 202 has a pre-programmed address of the communications control device 206. The pre-programmed address is utilized to directly communicate with the communications control device 206 via the macro wireless network 212.

Once the wireless IP session is established via the macro wireless network 212, the communications control device 206 authenticates the FR devices 202. Specifically, the communications control device 206 in the emergency command system 204 and the FR devices 202 have the appropriate authentication and encryption algorithms and keys (e.g., data encryption standard (DES), advanced encryption standard (AES), and IP security (IPSEC)) to support secure authenticated non-repudiated encrypted communications with integrity protection. The communications control device 206 authenticates the FR devices 202 before transmitting the tactical communications plan 208 to ensure secure communications between devices. Furthermore, the FR devices 202 can authenticate the communications control device 206 before receiving the tactical communications plan 208 to ensure that the plan is genuine. The transmission of the tactical communications plan 208 is IP packet-based, and is thus relayed in the form of IP packets to the FR devices 202 via the wireless IP data session, to be reassembled upon arrival.

Figure 3:
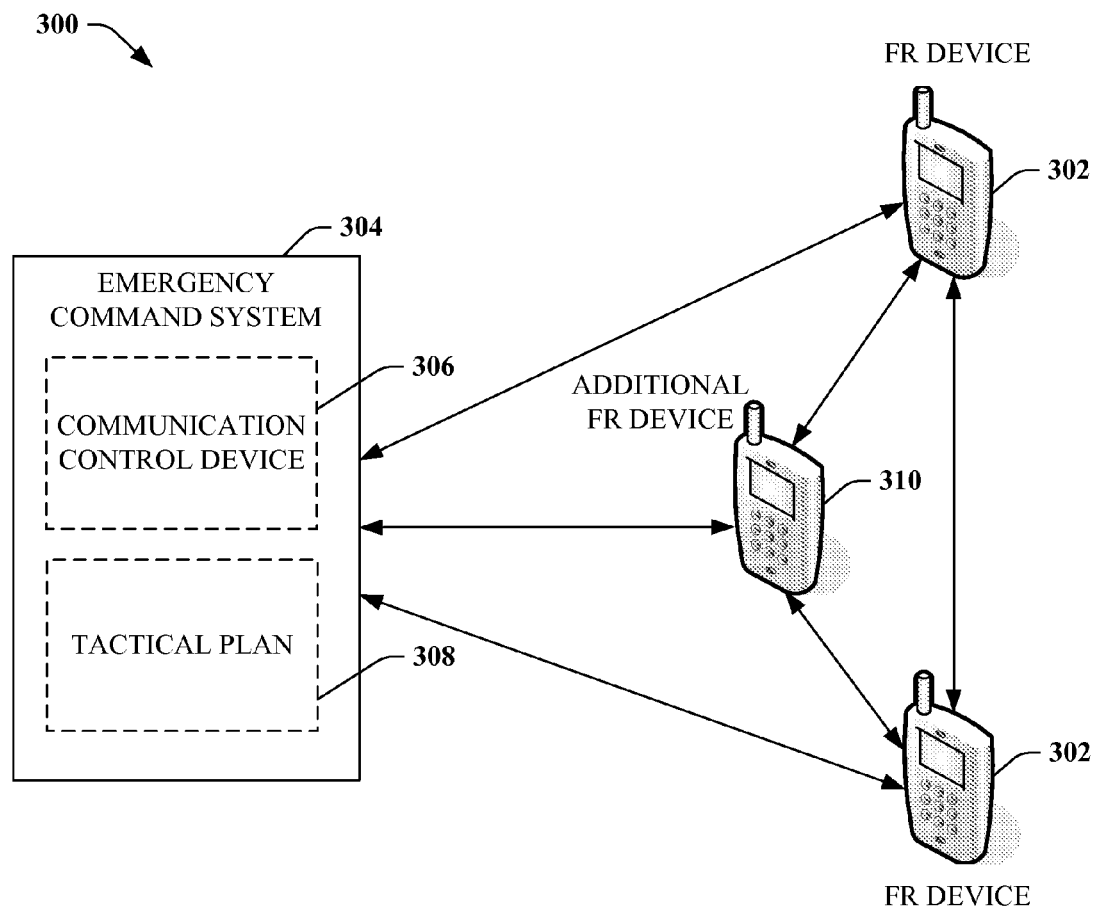
FIG. 3 illustrates the communications system, wherein additional FR devices are configured by a communications control device for interoperability between all FR devices.

To better illustrate operability of the system 100, another detailed example 300 of one particular utilization of such system 100 is provided herein. Specifically, FIG. 3 illustrates a system 300 wherein additional first responders report to an incident site after the original first responders have been dispatched. For example, sometimes it is necessary to dispatch additional emergency resources (e.g., first responders) in response to a major incident. During an emergency, the communications control device 306 maintains a list of associated FR devices 302 currently in use at the incident site. Accordingly, if additional first responders are needed at the incident site, the associated additional FR devices 310 are powered on and a wireless IP data session is established with the communications control device 306 via the macro wireless network. The communications control device 306 then adds these additional FR devices 310 to the list of associated FR devices currently in use at the incident site. Each additional FR device 310 is then authenticated via appropriate authentication and encryption algorithms and keys to verify the authenticity of the additional FR device 310.

Once the additional FR devices 310 have been authenticated, the communications control device 306 then transmits an updated tactical communications plan 308 to the additional FR devices 310 via the macro wireless network. The updated tactical communications plan 308 is available to all FR devices 302 at the scene and not just the additional FR devices 310 of the newly arrived first responders. Once the updated tactical communications plan 308 is transmitted to all FR devices 302 and 310, each FR device comprises identical radio configurations and channel assignments as the first responders already at the scene. As stated supra, the updated tactical communications plan 308 can also be displayed on the screens of the FR devices 302 and 310 with associated soft keys assigned so that the first responders can quickly and easily transfer between the various assigned tactical channels.

Furthermore, additional multimedia information, besides the tactical communications plan 308, can be transmitted to the FR devices 302 and 310. Additional multimedia information comprises at least one of building floor plans, area maps, weather information, MSDS sheets, and plume maps. This additional multimedia information can be disseminated to one or more FR devices depending on the incident commander or assigned communications officer. Typically, the incident commander identifies the additional multimedia information to be disseminated and identifies which of the FR devices at the scene should be the recipients (e.g., all, command level only or specific functional areas only). The incident commander then configures the additional multimedia information and the intended recipients into the communication control device 306 of the emergency command system 304.

The additional multimedia information is then transmitted to the intended FR devices via a wireless IP data session using the macro wireless network. Each recipient authenticates, receives and stores the additional multimedia information and sends back an acknowledgement to the communications control device 306 via the wireless IP data session using the macro wireless network. The communications control device 306 receives the acknowledgement responses and provides a status display to the incident commander, such that the incident commander can keep track of which FR device received the additional multimedia information and which did not. Furthermore, the additional multimedia information can be displayed on the screens of the FR devices with associated soft keys for user access.

Figure 4:
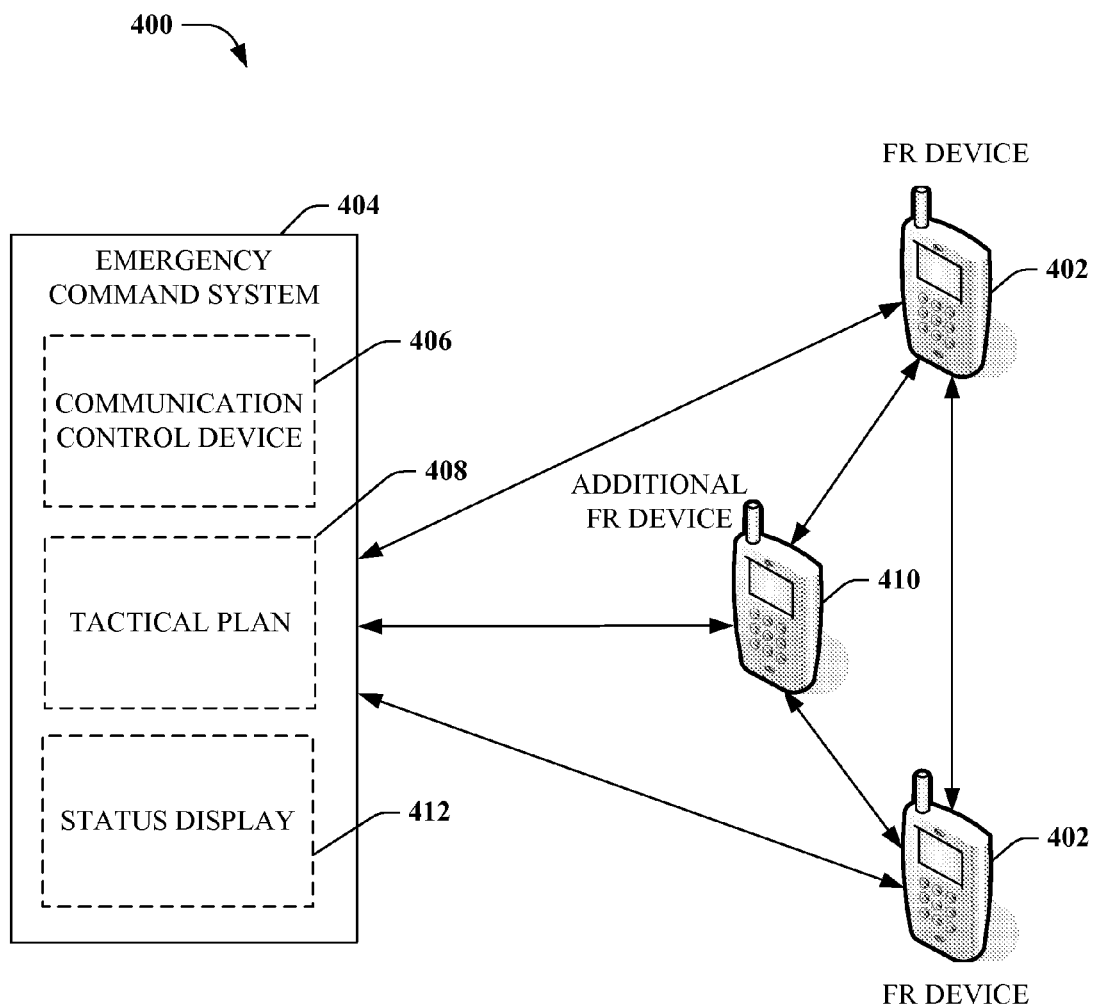
FIG. 4 illustrates the communications system, wherein the communications control device includes a status display that displays the status of the FR devices.

To better illustrate operability of the system 100, another detailed example 400 of one particular utilization of such system 100 is provided herein. Specifically, FIG. 4 illustrates a system 400 wherein the emergency command system 404 comprises a status display 412, to maintain and display a status for each FR device 402 and 410. Using the wireless IP data sessions established between the FR devices 402 and 410 and the communications control device 406, the communications control device 406 can maintain and display a status for each FR device 402 and 410.

The status information comprises at least one of a battery level, acknowledgement of communications, currently active tactical channel, assigned unit (e.g., Engine number), current location (e.g., if FR device is global positioning system (GPS) enabled), identification of the associated first responder (e.g., name, badge number, assigned fire station), status of life support equipment (e.g., oxygen levels), any special equipment with first responder, transmission of first responder borne sensors (e.g., ambient temperature, hazmat sensors, radiation monitor), and current activity (e.g., fire suppression, search and rescue, medical triage, rest area). Typically, the current activity would be set by the first responder via pre-defined soft keys on the FR device.

Furthermore, typically only one tactical channel can be active on the FR devices 402 and 410. However, the incident commander may need to contact all or some of the FR devices 402 and 410 immediately. Accordingly, the incident commander would inform the assigned communications officer of the specific FR devices to be contacted (e.g., command personnel or all FR devices in use). The communications officer then configures instructions in the communications control device 406 that the specific FR devices of the on-site first responders should be tuned to an assigned "All Responders" channel (e.g., Tac 1).

Using the wireless IP data sessions between the FR devices 402 and 410 and the communications control device 406, the instructions are transmitted to the specified FR devices. The FR devices receive the instructions and tune to the specified channel. Once the FR devices have been tuned to the specified channel, the FR devices respond to the instructions, stating that the FR device has been tuned to the indicated channel. The communications control device 406 receives these responses and incorporates the responses into the status display 412. When all FR devices have responded to the instructions, the communications officer informs the incident commander who can then issue the "all responders" message.

If one or more of the FR devices have not responded, the status display 412 can be updated and the non-responding FR device(s) can be contacted directly to determine if additional help is necessary. After the incident commander broadcasts the message, a soft key on the FR devices would be used by the first responders to acknowledge receipt of the message. Pressing the soft key on the FR devices sends an acknowledgement to the communications control device 406 via the wireless IP data session of the macro wireless network. Once the incident commander receives the acknowledgement(s), the status display 412 is again updated for each specified FR device active at the scene. This allows the incident commander to identify the first responders and associated FR device(s) that did not receive the broadcast and who may need additional assistance.

Furthermore, in situations where the active channel needs to be switched immediately and/or the first responder is unable or incapable of switching the associated FR device to the active channel, the incident commander can remotely set a specific FR device(s) to a specified channel. For example, if the specific first responder is incapacitated or otherwise unable to operate the associated FR device, then the incident commander can utilize the communications control device 406 to remotely switch the FR device to the designated channel and issue the emergency message and/or determine if the first responder is in need of additional assistance. For example, the incident commander can also configure the communications control device 406 to remotely switch all on-site command personnel to the Command tactical channel.

Referring to FIGS. 5-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
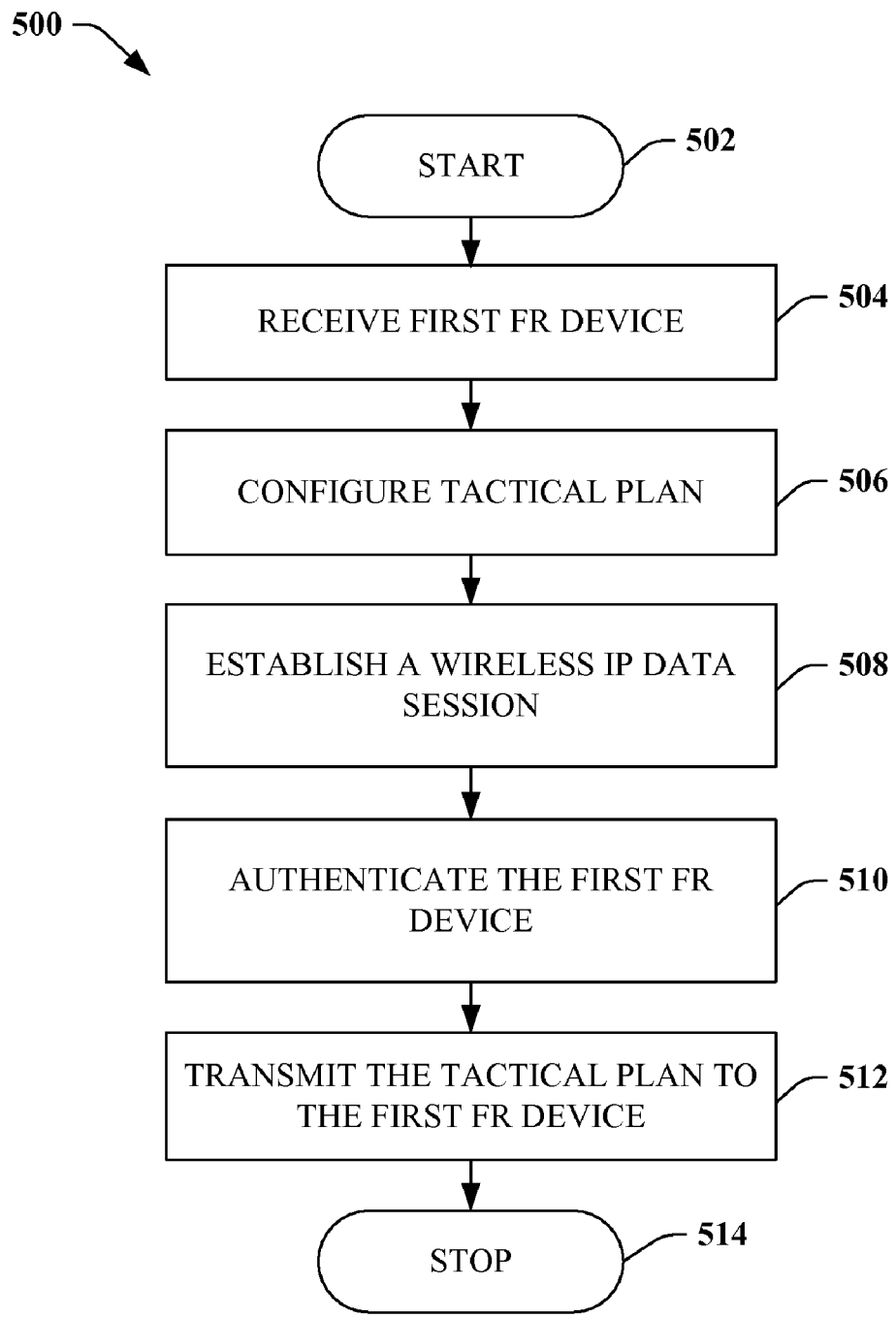
FIG. 5 is a flow diagram that is representative of a methodology for a communication system.

Turning specifically to FIG. 5, a methodology 500 of facilitating interoperability of FR wireless communications devices at an emergency location is illustrated. The methodology 500 starts at 502, and at 504 a first FR device is received. The first FR device is a dual mode wireless communications device that is capable of communicating directly with other FR devices in push-to-talk or walkie talkie mode (e.g., UHF, VHF, APCO P25, Motorola® trunking) and capable of voice and data communications with the macro wireless network using technologies such as GSM, UMTS, GPRS, EDGE, HSDPA, CDMA2000, and iDEN. The first FR device is used by a first responder at an emergency location for communicating with other FR devices and with the emergency command vehicle.

The emergency command vehicle comprises a communications control device that communicates directly with the FR devices. The communications control device is at least one of a PC, PDA and similar device with macro wireless network capabilities. The methodology proceeds to 506 wherein a tactical plan is configured into the communications control device. The tactical plan comprises at least one of allocation of the push-to-talk or walkie talkie channels, trunk groups, wireless macro network configuration information, telephone lists, and web sites for additional supporting information (e.g., MSDS).

At 508, a wireless IP data session is established between the communications control device and the first FR device. Specifically, a wireless macro network is utilized to establish the wireless IP data session. The wireless macro network includes GSM, UMTS, GPRS, EDGE, HSDPA, CDMA2000, and iDEN technologies. The first FR device initiates connection with a radio infrastructure, which in turn connects to the macro wireless network. Accordingly, the first FR device has a pre-programmed address of the communications control device which is then utilized to directly communicate with the communications control device.

At 510, the first FR device is authenticated via the communications control device using authentication data of the first FR device. Specifically, the communications control device in the emergency command vehicle has the appropriate authentication and encryption algorithms and keys (e.g., DES, AES, IPSEC) to support secure authenticated non-repudiated encrypted communications with integrity protection. The communications control device authenticates the first FR device before transmitting the tactical communications plan to ensure secure communications between the devices.

Finally, at 512, the tactical communications plan is transmitted from the communications control device to the first FR device via the macro wireless network. Once the tactical communications plan is received, the FR devices comprise identical radio configurations, channel assignments and identification of other supporting information. The methodology 500 stops at 514. Furthermore, the tactical communications plan can be displayed on a screen of the first FR device with associated soft keys assigned so that the first responder can quickly and easily transfer between the various assigned tactical channels.

Figure 6:
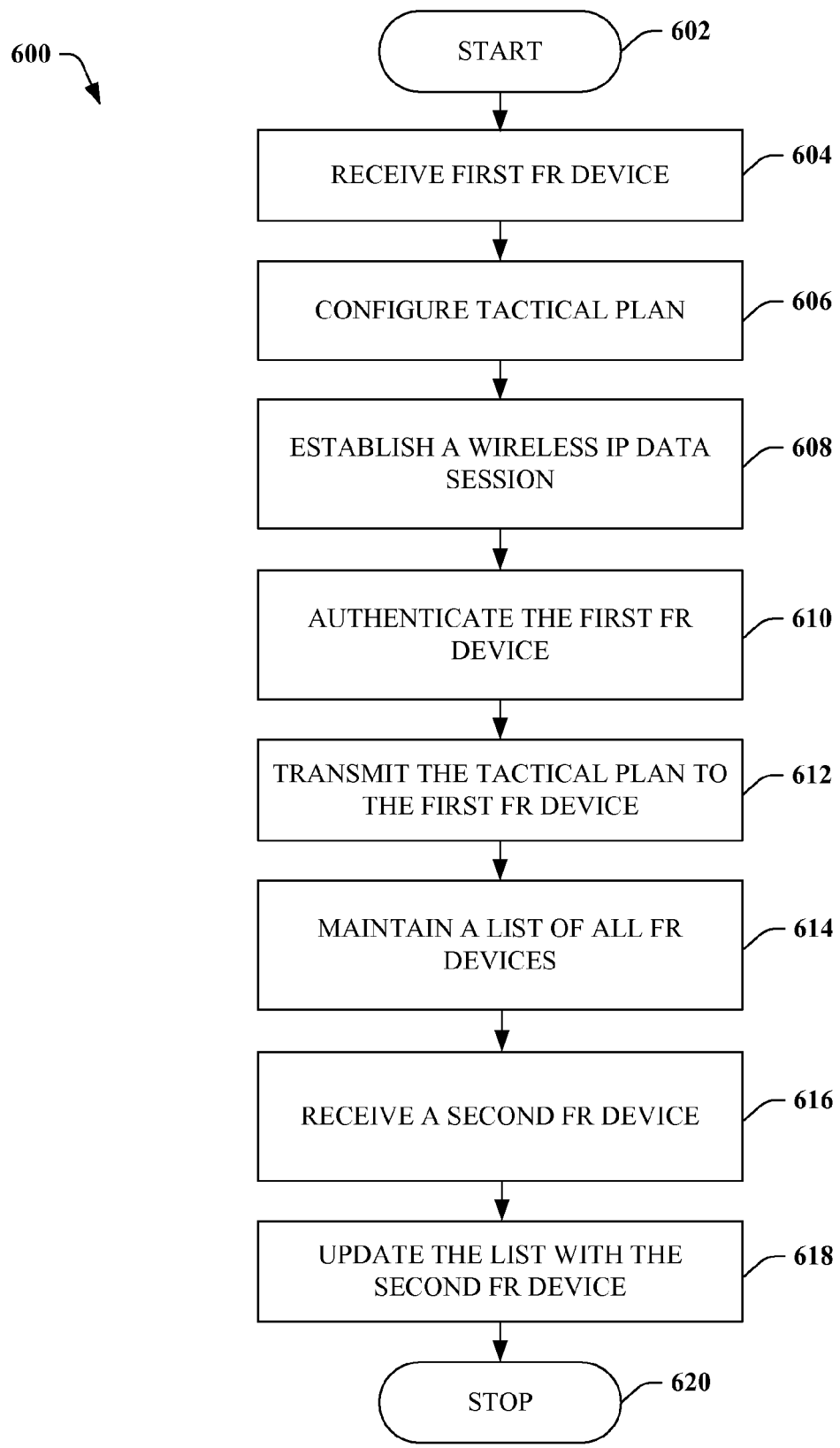
FIG. 6 is a flow diagram that is representative of a methodology for the communication system, wherein additional FR devices are configured by a communications control device to facilitate interoperability between all FR devices.

Turning specifically to FIG. 6, a methodology 600 of facilitating interoperability of FR wireless communications devices at an emergency location wherein additional FR devices are configured is illustrated. The methodology 600 starts at 602, and at 604 a first FR device is received. The first FR device is a dual mode wireless communications device that is capable of communicating directly with other FR devices in a push-to-talk mode and communicating voice and data communications with the macro wireless network. The methodology proceeds to 606 wherein a tactical plan is configured into a communications control device. The communications control device is a device within the emergency command vehicle that maintains the tactical communications plan.

At 608, a wireless IP data session is established between the communications control device and the first FR device via the wireless macro network. Specifically, the first FR device initiates connection with the radio infrastructure, which in turn connects to the macro wireless network. The first FR device has a pre-programmed address of the communications control device which is then utilized to directly communicate with the communications control device. At 610, the first FR device is authenticated via the communications control device using authentication data of the first FR device.

At 612, the tactical communications plan is transmitted from the communications control device to the first FR device via the macro wireless network. At 614, a list of all FR devices currently in use is maintained by the communications control device. The list comprises all associated FR devices currently in use at the emergency location.

At 616, a second or additional FR devices are received. The second FR devices are first responders and their associated FR devices that have been dispatched subsequent to the first FR devices. The second FR devices arrive and establish a wireless IP data session with the communications control device via the wireless macro network. The communications control device then authenticates the second FR devices and transmits an updated tactical plan to the second FR devices. The updated tactical plan is also made available to all FR devices currently in use at the emergency location.

Finally, at 618, the list of all associated FR devices currently in use at the emergency location is updated with the second FR devices. The methodology 600 stops at 620. Furthermore, the tactical communications plan can be displayed on the screen of the first and second FR devices with associated soft keys assigned so that the first responders can quickly and easily transfer between the various assigned tactical channels.

Figure 7:
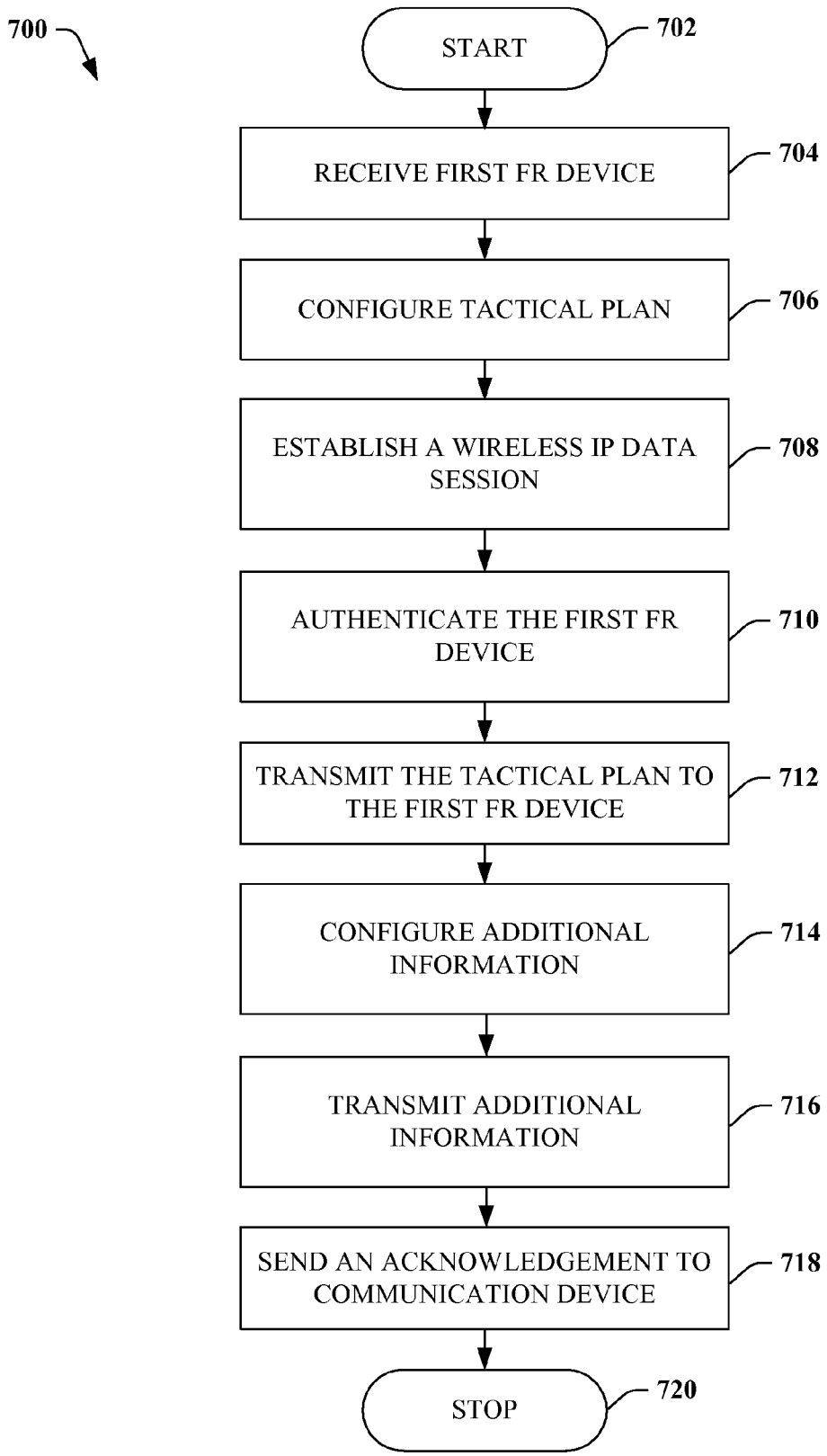
FIG. 7 is a flow diagram that is representative of a methodology for the communication system, wherein additional multimedia information is transmitted to the FR devices and acknowledged.

Now turning to FIG. 7, a methodology 700 of facilitating interoperability of FR wireless communications devices at an emergency location wherein additional multimedia information is transmitted is illustrated. The methodology 700 starts at 702, and at 704 a first FR device is received. The first FR device is a dual mode wireless communications device that is capable of communicating directly with other FR devices in a push-to-talk mode and communicating voice and data communications with the macro wireless network. The methodology proceeds to 706 wherein a tactical plan is configured into a communications control device. The communications control device is a device within the emergency command vehicle that maintains the tactical communications plan.

At 708, a wireless IP data session is established between the communications control device and the first FR device via the wireless macro network. Specifically, the first FR device initiates connection with the radio infrastructure, which in turn connects to the macro wireless network. The first FR device has a pre-programmed address of the communications control device which is then utilized to directly communicate with the communications control device. At 710, the first FR device is authenticated via the communications control device using authentication data of the first FR device. At 712, the tactical communications plan is transmitted from the communications control device to the first FR device via the macro wireless network.

At 714, additional multimedia information is configured into the communications control device. The additional multimedia information comprises building floor plans, area maps, weather information, MSDS sheets, and plume maps. Typically, the incident commander identifies the additional multimedia information to be disseminated and identifies which of the FR devices at the scene should be the recipients (e.g., all, command level only or specific functional areas only). The assigned communication officer then configures the additional multimedia information and the intended recipients into the communication control device of the emergency command vehicle.

At 716, the information is then transmitted to the intended FR devices via a wireless IP data session using the macro wireless network. Finally, at 718, the FR devices will send back an acknowledgement of receipt to the communications control device. Each recipient will receive and store the information and send back an acknowledgement to the communications control device via the wireless IP data session using the macro wireless network. The communications control device receives the acknowledgement responses and provides a status display to the incident commander, such that the incident commander can record which FR device received the additional multimedia information and which did not. The methodology 700 stops at 720. Furthermore, the additional multimedia information can be displayed on screens of the FR devices with associated soft keys for user access.

Figure 8:
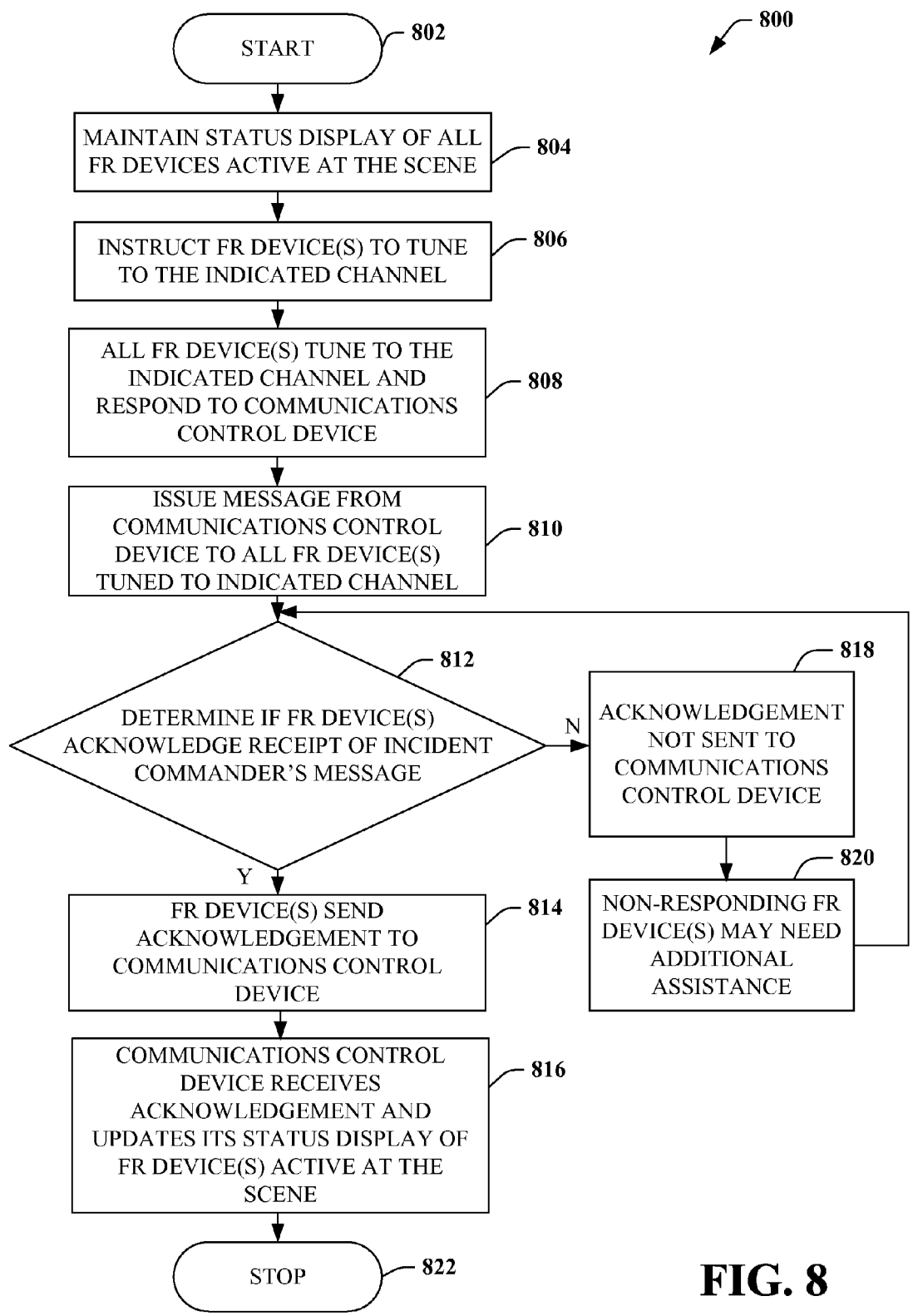
FIG. 8 is a flow diagram that is representative of a methodology for the communication system, wherein the FR devices are instructed to tune to a specific channel to receive a message from the emergency command vehicle.

Now turning to FIG. 8, a methodology 800 of facilitating interoperability of FR wireless communications devices at an emergency location wherein the incident commander needs to communicate with all on-site FR devices is illustrated. The methodology 800 starts at 802, and at 804 a status display is maintained for all FR devices currently active at the incident scene. Using the wireless IP data sessions established between the FR devices and the communications control device, the communications control device can maintain and display a status for each FR device. The status information comprises at least one of a battery level, acknowledgement of communications, currently active tactical channel, assigned unit (e.g., Engine number), current location (e.g., if FR device is GPS enabled), identification of the associated first responder (e.g., name, badge number, assigned fire station), status of life support equipment (e.g., oxygen levels), any special equipment with first responder, transmission of first responder borne sensors (e.g., ambient temperature, hazmat sensors, radiation monitor), and current activity (e.g., fire suppression, search and rescue, medical triage, rest area). Typically, the current activity would be set by the first responder via pre-defined soft keys on the FR device.

At 806, the incident commander instructs the FR devices to tune to a specific channel via the communications control device. Typically, only one tactical channel can be active on the FR devices. However, the incident commander may need to contact all or some of the FR devices immediately. Accordingly, the communications officer configures instructions from the incident commander in the communications control device that all FR devices of the on-site first responders should be tuned to an assigned "All Responders" channel (e.g., Tac 1). Using the wireless IP data sessions between the FR devices and the communications control device, the instructions are transmitted to the specified FR devices.

At 808, the FR devices receive the instructions and tune to the specified channel. Once the FR devices have been tuned to the specified channel, the FR devices respond to the instructions, stating that the FR device has been switched to the indicated channel. The communications control device receives these responses and incorporates the responses into the status display. When all FR devices have responded to the instructions, the communications officer informs the incident commander who can then issue the "all responders" message. At 810, the message from the incident commander is issued via the communication control device to all FR devices tuned to the indicated channel.

At 812, it is determined if one or more of the FR devices have acknowledged receipt of the incident commander's message. At 814, one or more of the FR devices sends an acknowledgement to the communications control device of receipt of the incident commander's message. After the incident commander broadcasts the message, a soft key on the FR devices would be used by the first responders to acknowledge receipt of the message. Pressing the soft key on the FR devices sends an acknowledgement to the communications control device via the wireless IP data session of the macro wireless network. At 816, the communications control device receives acknowledgement from the FR device(s) and updates the status display. Once the incident commander receives the acknowledgement(s), the status display is updated for each FR device currently active at the scene.

At 818, one or more of the FR devices have not responded. Specifically, acknowledgement has not been sent by the FR device(s) and/or received by the communications control device. At 820, the status display can be updated and the non-responding FR device(s) can be contacted directly to determine if additional help is necessary. The methodology 800 stops at 822.

Figure 9:
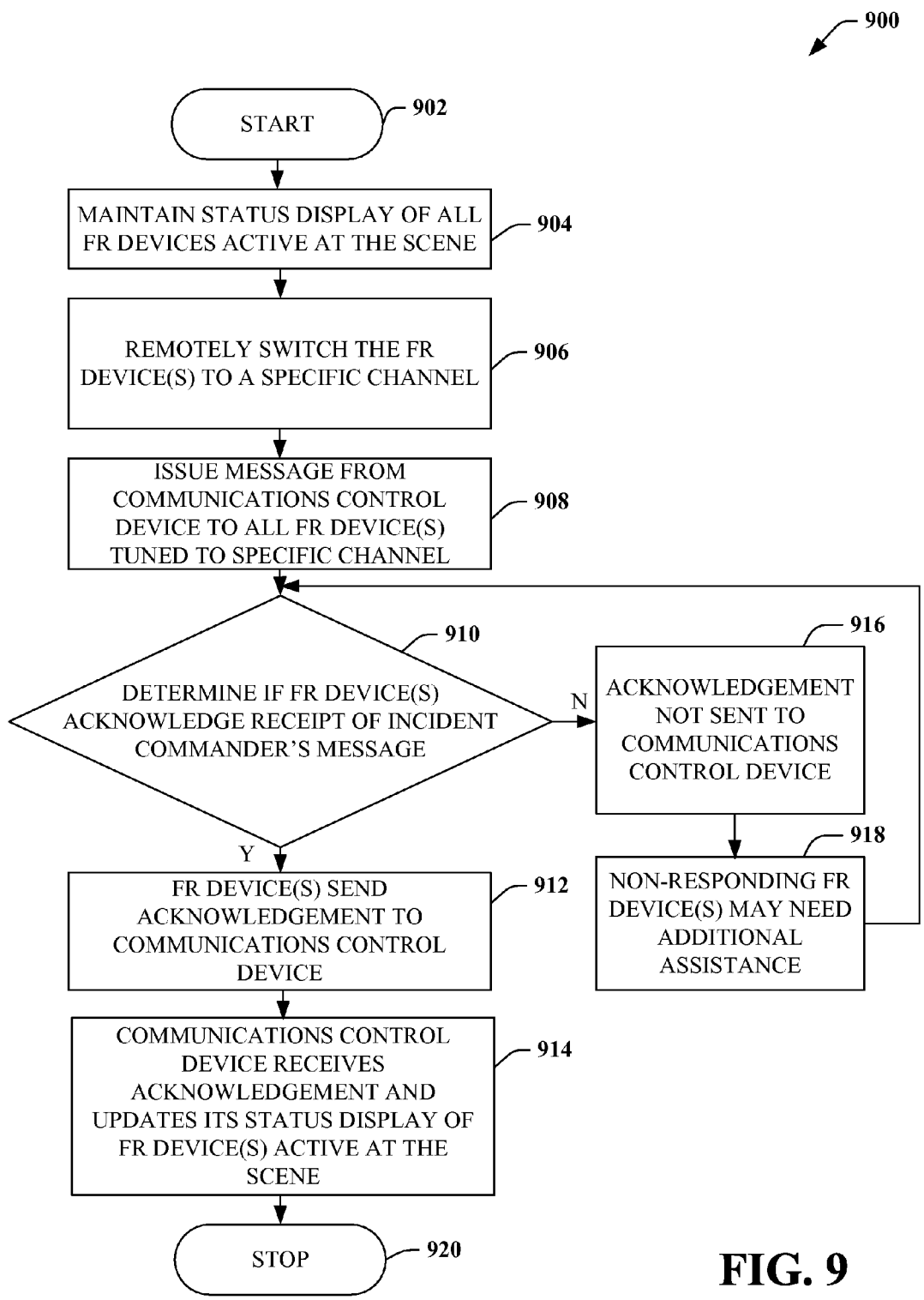
FIG. 9 is a flow diagram that is representative of a methodology for the communication system, wherein the FR devices are remotely switched to a specific channel to receive a message from the emergency command vehicle.

Turning specifically to FIG. 9, a methodology 900 of facilitating interoperability of FR wireless communications devices at an emergency location wherein the incident commander needs to immediately communicate with all on-site FR devices is illustrated. The methodology 900 starts at 902, and at 904 a status display is maintained for all FR devices currently active at the scene. Using the wireless IP data sessions established between the FR devices and the communications control device, the communications control device can maintain and display a status for each FR device.

At 906, the incident commander remotely switches specific FR devices to a specified channel via the communications control device. Typically, only one tactical channel can be active on the FR devices. However, the incident commander may need to contact all or some of the FR devices immediately. Accordingly, the incident commander can instruct the assigned communication officer to remotely set a specific FR device(s) to a specified channel. For example, the first responder may be incapacitated or otherwise unable to operate the FR device. Thus, the incident commander can instruct the assigned communication officer to configure the communications control device to remotely switch the specific FR device to the specified tactical channel. For example, all on-site command personnel may be remotely switched to the Command tactical channel via the communications control device.

Using the wireless IP data sessions between the FR devices and the communications control device, the instructions are transmitted to the specified FR devices. At 908, the message from the incident commander is issued via the communication control device to all FR devices remotely switched to the specified channel. At 910, it is determined if one or more of the FR devices have acknowledged receipt of the incident commander's message.

At 912, one or more of the FR devices sends an acknowledgement to the communications control device of receipt of the incident commander's message. After the incident commander broadcasts the message, a soft key on the FR devices would be used by the first responders to acknowledge receipt of the message. Pressing the soft key on the FR devices sends an acknowledgement to the communications control device via the wireless IP data session of the macro wireless network. At 914, the communications control device receives acknowledgement from the FR device(s) and updates the status display. Once the incident commander receives the acknowledgement(s), the status display is updated for each FR device currently active at the scene.

At 916, one or more of the FR devices have not responded. Specifically, acknowledgement has not been sent by the FR device(s) or received by the communications control device. At 918, the status can be updated and the non-responding FR device(s) can be contacted directly to determine if additional help is necessary. The methodology 900 stops at 920.

Figure 10:
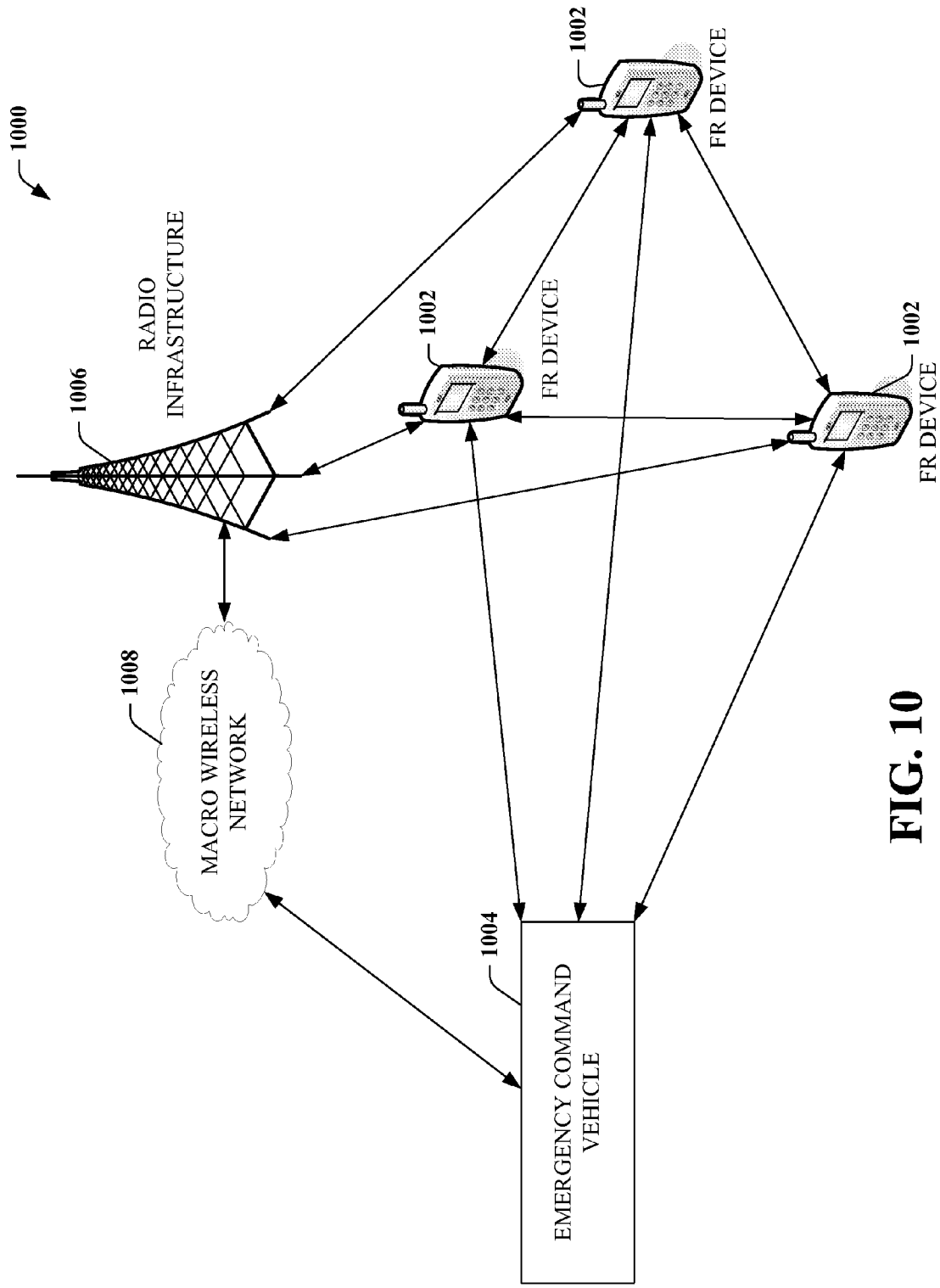
FIG. 10 illustrates a system for providing the control and management of inter-operable communications between FR devices at an emergency location.

Referring now to FIG. 10, there is illustrated a system 1000 for providing the control and management of the interoperability of FR devices of the first responders at the scene of an incident. The emergency command vehicle 1004 is located at the scene of an incident and comprises communications capabilities for both voice and data services. The emergency command vehicle 1004 can be part of an emergency command center, mobile command post, or any other suitable structure. The emergency command vehicle 1004 comprises a communication control device utilized by the incident commander or assigned communications officer to communicate with the FR devices 1002.

The communications control device allows the emergency command vehicle 1004 to have full communications capabilities for both voice and data services. It allows for the capability to establish voice or data communications via the macro wireless network using technologies such as GSM, UMTS, GPRS, EDGE, HSDPA, CDMA2000, and iDEN. The vehicle 1004 also has the capabilities to establish direct push-to-talk communications (e.g., UHF, VHF, APCO P25, Motorola® trunking) with the FR devices 1002 of the on-scene first responders.

The FR devices 1002 are the communication devices of the first responders. The FR devices 1002 are typically dual mode wireless devices that are capable of communicating directly with other FR devices in push-to-talk or walkie talkie mode (e.g., UHF, VHF, APCO P25, Motorola® trunking) and are capable of voice and data communications with the macro wireless network using technologies such as GSM, UMTS, GPRS, EDGE, HSDPA, CDMA2000, and iDEN. The FR devices 1002 can also provide voice services (e.g., VoIP), streaming video services, file transfers and other types of data services (e.g., pictures, text, telemedicine, sensory data).

Furthermore, the system 1000 can include a macro wireless network 1008. The macro wireless network 1008 includes GSM, UMTS, GPRS, EDGE, HSDPA, CDMA2000, and iDEN technologies. Tower 1006 represents the radio infrastructure used to connect to the macro wireless network 1008. Typically, the FR devices 1002 are able to communicate with the emergency command vehicle 1004 via the macro wireless network, but are unable to establish efficient interoperability between all devices at the incident scene. Accordingly, FR devices 1002 utilize a tactical plan configured by the emergency command vehicle 1004 to manage and control interoperable communications between all FR devices 1002 and the emergency command vehicle 1004.

Figure 11:
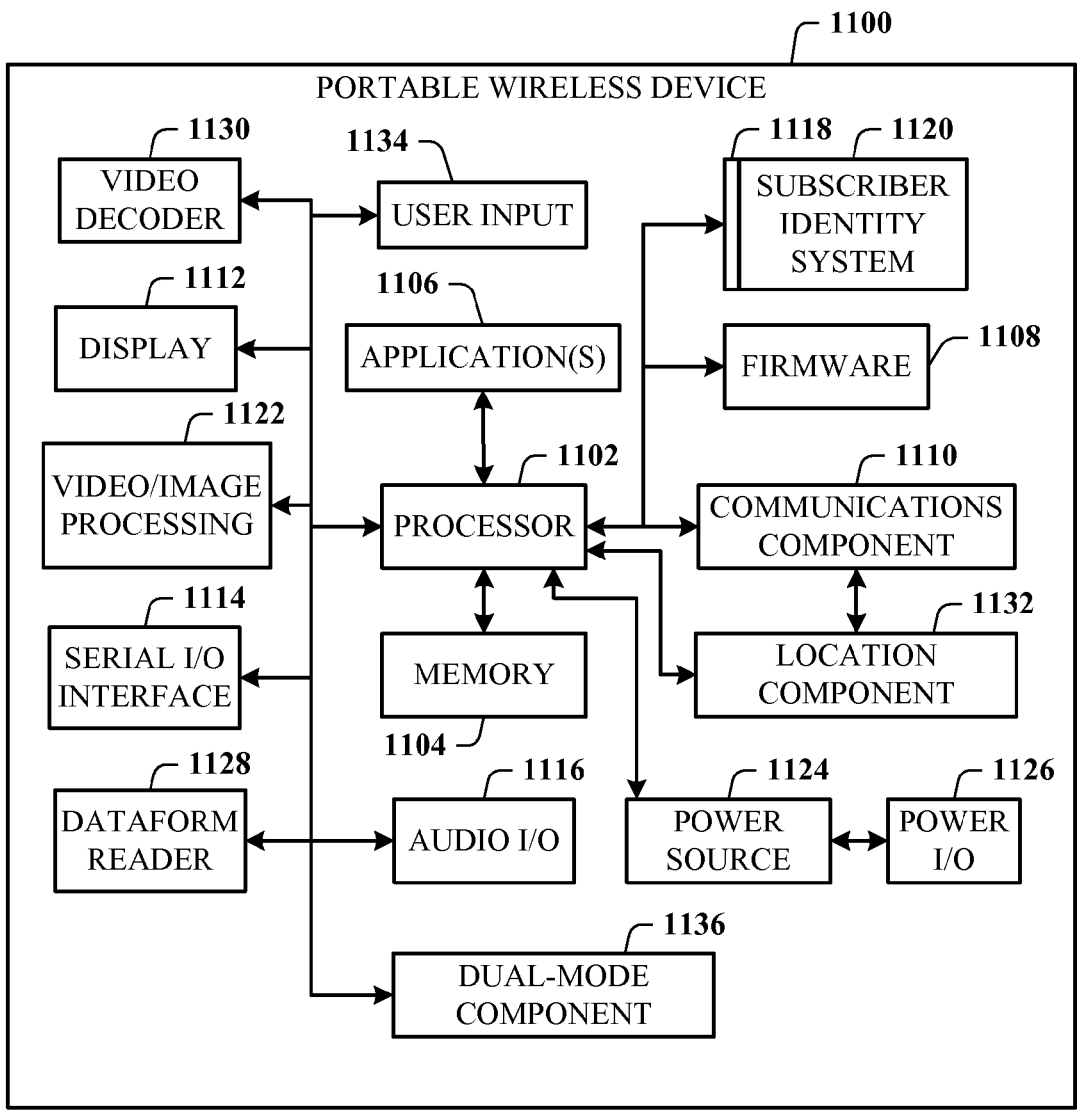
FIG. 11 is an exemplary portable wireless device (PWD) for use with the communication system.

Referring now to FIG. 11, there is illustrated a detailed schematic block diagram of portable wireless device (PWD) 1100 (e.g., mobile handset, push-to-talk handset, FR device) that operates in accordance with the subject invention. The PWD 1100 includes a processor 1102 for controlling and processing all onboard operations and functions. A memory 1104 interfaces to the processor 1102 for storage of data and one or more applications 1106 (e.g., a video player software, user feedback component software, etc.). The applications can include the client that provides estimation execution of a task for characterizing the local mobile environment and then transmitting the characterization data to the base station. Other applications can include voice recognition of predetermined voice commands that facilitate initiation of the user feedback signal.

The applications 1106 can be stored in the memory 1104 and/or in a firmware 1108, and executed by the processor 1102 from either or both the memory 1104 or/and the firmware 1108. The firmware 1108 also stores startup code for execution in initializing the handset 1100. A communications component 1110 interfaces to the processor 1102 to facilitate wired/wireless communications with external systems, e.g., cellular networks, VoIP networks, and so on. The handset 1100 includes devices such as a cellular telephone, a PDA with mobile communications capabilities, and messaging-centric devices.

The handset 1100 includes a display 1112 for displaying text, images, video, telephony functions (e.g., a Caller ID function), setup functions, and for user input. The display 1112 can also accommodate the presentation of multimedia content. A serial I/O interface 1114 is provided in communication with the processor 1102 to facilitate serial communication (e.g., USB, and/or IEEE 1394) via a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals via a microphone to record data and/or telephony voice data, and for inputting voice signals for telephone conversations.

The handset 1100 includes a slot interface 1118 for accommodating a SIS (subscriber identity system) module in the form factor of a card subscriber identity module (SIM) 1120, and interfacing the SIM card 1120 to the processor 1102. However, it is to be appreciated that the SIM card 1120 can be manufactured into the handset 1100, and updated by downloading data and software thereinto.

The handset 1100 can process IP data traffic via the communications component 1110 to accommodate IP traffic from an IP network such as, for example, the Internet, a corporate intranet, a home network, a person area network, etc., via an ISP or cable provider. Thus, VoIP traffic can be utilized by the handset 1100, and IP-based multimedia content can be received in either an encoded or a decoded format.

A video and/or imaging processing component 1122 (e.g., a camera) can be provided for decoding encoded multimedia content. The handset 1100 also includes a power source 1124 in the form of batteries and/or an AC power subsystem, which power source 1124 interfaces to an external power system or charging equipment (not shown) via a power I/O component 1126.

The handset 1100 can also include a dataform reader 1128 suitably designed to read many types of dataforms. For example, the reader 1128 can scan product bar codes of two and three dimensions, and other types of indicia.

The handset 1100 can also include a video decoder component 1130 for processing video content received and transmitted. A location tracking component 1132 facilitates geographically locating the handset 1100. As described hereinabove, this can occur when the user initiates the feedback signal automatically or manually.

A user input component 1134 facilitates the user initiating the quality feedback signal. The input component can include such conventional input device technologies such as a keypad, keyboard, mouse, stylus pen, and touch screen, for example.

A dual-mode functionality component 1136 that facilitates the capabilities of a user to establish direct push-to-talk communications with other PWD devices and to establish voice and data communications with a macro wireless network.

Figure 12:
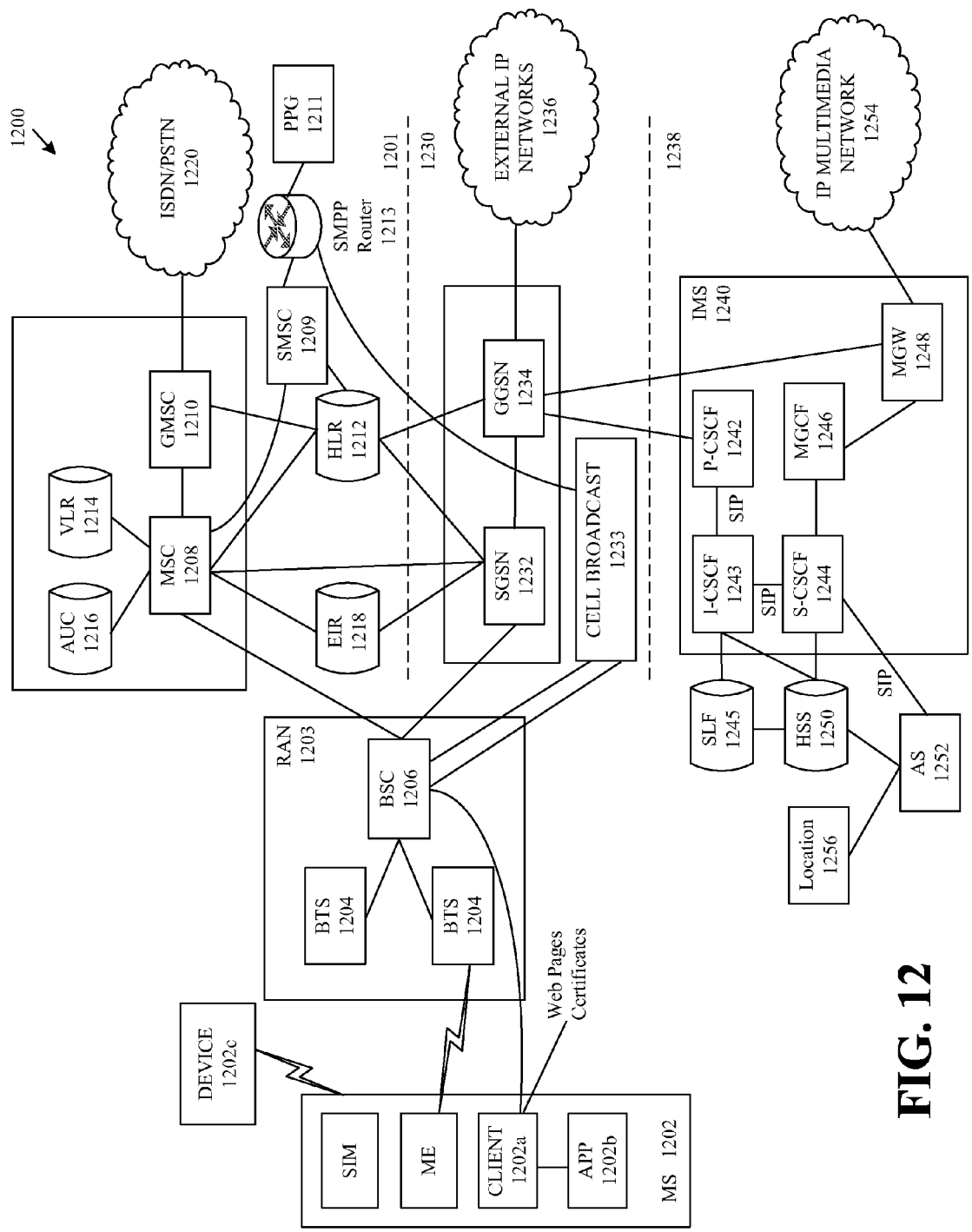
FIG. 12 is an exemplary networking environment for use with the communication system.

Now turning to FIG. 12, such figure depicts a GSM/GPRS/IP multimedia network architecture 1200 that includes a GSM core network 1201, a GPRS network 1230 and an IP multimedia network 1238. The GSM core network 1201 includes a Mobile Station (MS) 1202, at least one Base Transceiver Station (BTS) 1204 and a Base Station Controller (BSC) 1206. The MS 1202 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 1202 includes an embedded client 1202a that receives and processes messages received by the MS 1202. The embedded client 1202a may be implemented in JAVA and is discuss more fully below.

The embedded client 1202a communicates with an application 1202b that provides services and/or information to an end user. One example of the application may be navigation software that provides near real-time traffic information that is received via the embedded client 1202a to the end user. The navigation software may provide road conditions, suggest alternate routes, etc. based on the location of the MS 1202. Those of ordinary skill in the art understand that there are many different methods and systems of locating an MS 1202.

Alternatively, the MS 1202 and a device 1202c may be enabled to communicate via a short-range wireless communication link, such as Bluetooth®. For example, a Bluetooth® SIM Access Profile may be provided in an automobile (e.g., device 1202c) that communicates with the SIM in the MS 1202 to enable the automobile's communications system to pull information from the MS 1202. The Bluetooth communication system in the vehicle becomes an "embedded phone" that employs an antenna associated with the automobile. The result is improved reception of calls made in the vehicle. As one of ordinary skill in the art would recognize, an automobile is one example of the device 1202c. There may be an endless number of devices 1202c that use the SIM within the MS 1202 to provide services, information, data, audio, video, etc. to end users.

The BTS 1204 is physical equipment, such as a radio tower, that enables a radio interface to communicate with the MS. Each BTS may serve more than one MS. The BSC 1206 manages radio resources, including the BTS. The BSC may be connected to several BTSs. The BSC and BTS components, in combination, are generally referred to as a base station (BSS) or radio access network (RAN) 1203.

The GSM core network 1201 also includes a Mobile Switching Center (MSC) 1208, a Gateway Mobile Switching Center (GMSC) 1210, a Home Location Register (HLR) 1212, Visitor Location Register (VLR) 1214, an Authentication Center (AuC) 1218, and an Equipment Identity Register (EIR) 1216. The MSC 1208 performs a switching function for the network. The MSC also performs other functions, such as registration, authentication, location updating, handovers, and call routing. The GMSC 1210 provides a gateway between the GSM network and other networks, such as an Integrated Services Digital Network (ISDN) or Public Switched Telephone Networks (PSTNs) 1220. In other words, the GMSC 1210 provides interworking functionality with external networks.

The HLR 1212 is a database that contains administrative information regarding each subscriber registered in a corresponding GSM network. The HLR 1212 also contains the current location of each MS. The VLR 1214 is a database that contains selected administrative information from the HLR 1212. The VLR contains information necessary for call control and provision of subscribed services for each MS currently located in a geographical area controlled by the VLR. The HLR 1212 and the VLR 1214, together with the MSC 1208, provide the call routing and roaming capabilities of GSM. The AuC 1216 provides the parameters needed for authentication and encryption functions. Such parameters allow verification of a subscriber's identity. The EIR 1218 stores security-sensitive information about the mobile equipment.

A Short Message Service Center (SMSC) 1209 allows one-to-one Short Message Service (SMS) messages to be sent to/from the MS 1202. A Push Proxy Gateway (PPG) 1211 is used to "push" (e.g., send without a synchronous request) content to the MS 1202. The PPG 1211 acts as a proxy between wired and wireless networks to facilitate pushing of data to the MS 1202. A Short Message Peer to Peer (SMPP) protocol router 1213 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1202 sends a location update including its current location information to the MSC/VLR, via the BTS 1204 and the BSC 1206. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1230 is logically implemented on the GSM core network architecture by introducing two packet-switching network nodes, a serving GPRS support node (SGSN) 1232, a cell broadcast and a Gateway GPRS support node (GGSN) 1234. The SGSN 1232 is at the same hierarchical level as the MSC 1208 in the GSM network. The SGSN controls the connection between the GPRS network and the MS 1202. The SGSN also keeps track of individual MS's locations and security functions and access controls.

A Cell Broadcast Center (CBC) 1233 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1234 provides a gateway between the GPRS network and a public packet network (PDN) or other IP networks 1236. That is, the GGSN provides interworking functionality with external networks, and sets up a logical link to the MS through the SGSN. When packet-switched data leaves the GPRS network, it is transferred to an external TCP-IP network 1236, such as an X.25 network or the Internet. In order to access GPRS services, the MS first attaches itself to the GPRS network by performing an attach procedure. The MS then activates a packet data protocol (PDP) context, thus activating a packet communication session between the MS. the SGSN, are the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1230 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 1238 was introduced with 3GPP Release 5, and includes an IP multimedia subsystem (IMS) 1240 to provide rich multimedia services to end users. A representative set of the network entities within the IMS 1240 are a call/session control function (CSCF), a media gateway control function (MGCF) 1246, a media gateway (MGW) 1248, and a master subscriber database, called a home subscriber server (HSS) 1250. The HSS 1250 may be common to the GSM network 1201, the GPRS network 1230 as well as the IP multimedia network 1238.

The IP multimedia system 1240 is built around the call/session control function, of which there are three types: an interrogating CSCF (I-CSCF) 1243, a proxy CSCF (P-CSCF) 1242, and a serving CSCF (S-CSCF) 1244. The P-CSCF 1242 is the MS's first point of contact with the IMS 1240. The P-CSCF 1242 forwards session initiation protocol (SIP) messages received from the MS to an SIP server in a home network (and vice versa) of the MS. The P-CSCF 1242 may also modify an outgoing request according to a set of rules defined by the network operator (for example, address analysis and potential modification).

The I-CSCF 1243 forms an entrance to a home network and hides the inner topology of the home network from other networks and provides flexibility for selecting an S-CSCF. The I-CSCF 1243 may contact a subscriber location function (SLF) 1245 to determine which HSS 1250 to use for the particular subscriber, if multiple HSS's 1250 are present. The S-CSCF 1244 performs the session control services for the MS 1202. This includes routing originating sessions to external networks and routing terminating sessions to visited networks. The S-CSCF 1244 also decides whether an application server (AS) 1252 is required to receive information on an incoming SIP session request to ensure appropriate service handling. This decision is based on information received from the HSS 1250 (or other sources, such as an application server 1252). The AS 1252 also communicates to a location server 1256 (e.g., a Gateway Mobile Location Center (GMLC)) that provides a position (e.g., latitude/longitude coordinates) of the MS 1202.

The HSS 1250 contains a subscriber profile and keeps track of which core network node is currently handling the subscriber. It also supports subscriber authentication and authorization functions (AAA). In networks with more than one HSS 1250, a subscriber location function provides information on the HSS 1250 that contains the profile of a given subscriber.

The MGCF 1246 provides interworking functionality between SIP session control signaling from the IMS 1240 and ISUP/BICC call control signaling from the external GSTN networks (not shown). It also controls the media gateway (MGW) 1248 that provides user-plane interworking functionality (e.g., converting between AMR- and PCM-coded voice). The MGW 1248 also communicates with other IP multimedia networks 1254.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
a communications control device configured to maintain a tactical communications plan that specifies an assignment of tactical channels, and direct the tactical communications plan toward a first wireless communications device,
wherein the tactical channels comprise channels corresponding to respective responder groups, and
wherein the tactical communications plan includes information that assigns the tactical channels to the first wireless communications device and is used by the first wireless communications device to display a set of soft keys corresponding to respective channels of the tactical channels that facilitate transition between the tactical channels.

2. The system of claim 1, wherein the communications control device is further configured to allow manual configuration of the tactical communications plan.

3. The system of claim 1, wherein the communications control device is further configured to establish a wireless internet protocol data session with the first wireless communications device via a macro wireless network.

4. The system of claim 1, wherein the communications control device is further configured to authenticate the first wireless communications device via authentication and encryption data of the first wireless communications device and the communications control device.

5. The system of claim 3, wherein the communications control device is further configured to transmit the tactical communications plan via the wireless internet protocol data session to the first wireless communications device.

6. The system of claim 1, wherein the communications control device is further configured to maintain a list of wireless communications devices in use at an incident site and respective statuses of the wireless communications devices.

7. The system of claim 6, wherein the communications control device is further configured to authenticate and add a second wireless communications device to the list in response to detection of the second wireless communications device.

8. The system of claim 7, wherein the communications control device is further configured to send an updated tactical communications plan toward the first wireless communications device and the second wireless communications device, wherein the updated tactical communications plan includes information that causes the first wireless communications device and the second wireless communications device to switch to identical radio configurations and identical channel assignments.

9. The system of claim 1, wherein the communications control device is further configured to send multimedia information toward the first wireless communications device.

10. The system of claim 9, wherein the multimedia information comprises a building floor plan.

11. The system of claim 9, wherein the multimedia information comprises an area map.

12. The system of claim 9, wherein the communications control device is further configured to send the multimedia information toward the first wireless communications device via a wireless internet protocol data session using a macro wireless network.

13. The system of claim 1, wherein the communications control device is further configured to instruct the first wireless communications device to tune to a specified channel.

14. The system of claim 1, wherein the tactical communications plan comprises an allocation of trunk groups.

15. The system of claim 1, wherein the tactical communications plan comprises an allocation of wireless macro network configuration information.

16. A method comprising:
detecting, by a system including at least one processor, a first wireless communications device;
maintaining, by the system, a tactical communications plan defining a set of tactical channels in a communications control device, wherein the tactical channels comprise channels corresponding to respective groups of responders;
facilitating, by the system, establishing a wireless internet protocol data session between the communications control device and the first wireless communications device; and
sending, by the system, the tactical communications plan toward the first wireless communications device, the tactical communications plan including information that designates the set of tactical channels to the first wireless communications device and is used by the first wireless communications device to render a set of soft keys corresponding to respective channels of the set of tactical channels, the soft keys transitioning the first wireless device between the tactical channels in response to the soft keys receiving input.

17. The method of claim 16, further comprising displaying the tactical communications plan on a display of the first wireless communications device.

18. The method of claim 16, further comprising:
maintaining a list of wireless communications devices in use within range of the communications control device;
detecting a second wireless communications device within range of the communications control device; and
updating the list of wireless communications devices with the second wireless communications device in response to the detecting the second wireless communications device.

19. The method of claim 18, further comprising:
sending an updated tactical communications plan toward the first wireless communications device and the second wireless communications device, the updated tactical communications plan including information designating a common radio configuration and a common channel assignment to the first wireless communications device and the second wireless communications device.

20. The method of claim 16, further comprising:
sending multimedia information toward the first wireless communications device; and
receiving an acknowledgement indicating that the multimedia information has been received.

21. The method of claim 16, further comprising:
maintaining a status display of active wireless communications devices within range of the wireless communications control device;
instructing the active wireless communications devices to tune to an indicated common channel;
sending a message toward the active wireless communications devices over the indicated common channel;
receiving an acknowledgement of receiving the message from one or more of the active wireless communications devices; and
updating the status display to reflect the acknowledgement received from the one or more of the active wireless communications devices.

22. The method of claim 16, further comprising authenticating the first wireless communications device via the communications control device using authentication data received from the first wireless communications device.

23. The method of claim 16, further comprising maintaining and displaying a status of the first wireless communications device.

24. The method of claim 23, wherein the status comprises a current location.

25. The method of claim 23, wherein the status comprises a status of life support equipment.

26. A non-transitory computer-readable medium having stored thereon computer-executable instructions that, in response to execution, cause a computing system to perform operations, comprising:
   detecting a first wireless communications device;
   storing a tactical communications plan defining a set of tactical channels corresponding to respective responder groups;
   establishing a wireless internet protocol data session with the first wireless communications device; and
   sending the tactical communications plan toward the first wireless communications device via a wireless macro network, the tactical communications plan containing data that assigns the set of tactical channels to the first wireless communications device and is processed by the first wireless communications device to render a soft key corresponding to a channel of the set of tactical channels and facilitating transition of the first wireless communications device to the channel.

* * * * *